United States Patent Office 2,961,121
Patented Nov. 22, 1960

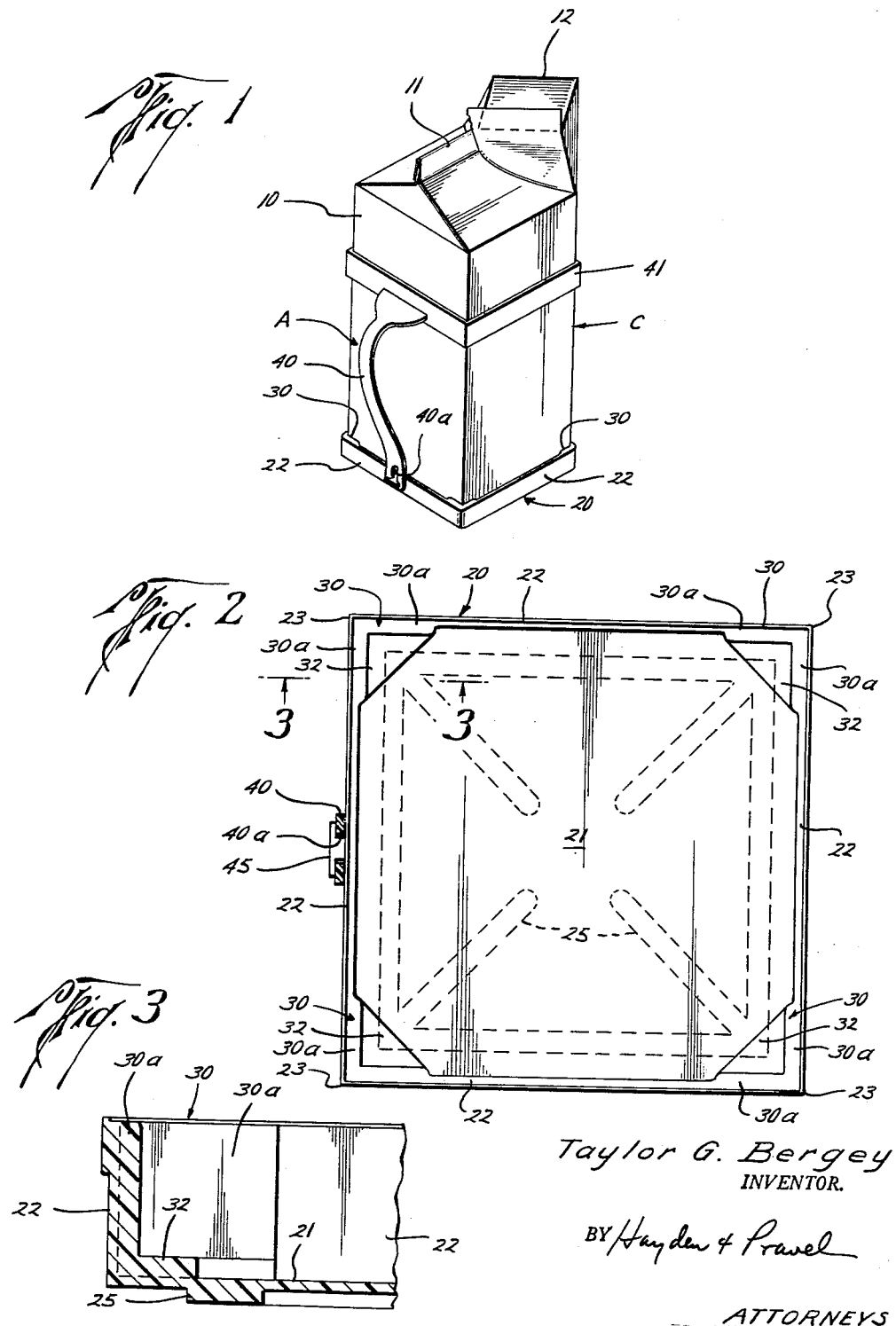

2,961,121

RECEPTACLE AND HANDLE FOR MILK CARTONS AND THE LIKE

Taylor G. Bergey, 4306 Tonawanda Drive, Houston 13, Tex.

Filed Oct. 29, 1958, Ser. No. 770,534

5 Claims. (Cl. 220—85)

This invention relates to a receptacle and handle for milk cartons and the like.

Cartons made of heavy paper or cardboard and coated with wax or similar material are commonly used today for milk containers. Such cartons are generally highly satisfactory in use, but frequently, such cartons develop slow leaks particularly at the bottom corners. Such leakage is especially bad in home use since the milk leaking from the carton collects in the refrigerator and often drips into other foods therebelow in the refrigerator. Such cartons, particularly the half gallon sizes and larger, are also difficult to handle because children and some adults cannot readily grasp and hold the cartons for pouring milk therefrom.

It is therefore an object of this invention to provide a new and improved receptacle for the lower end of cartons to assist in preventing leakage of the milk or other fluid in the carton therefrom.

An important object of this invention is to provide a new and improved receptacle for sealing the corners of a container at its lower edges to assist in preventing leakage therefrom, and for receiving and holding any liquid which might leak from the container, whereby leakage of liquid from the container is either prevented or confined by said receptacle.

A further object of this invention is to provide a new and improved receptacle and handle for milk cartons and the like, wherein the receptacle is mounted on the carton and serves as the means for connecting the lower portion of the handle to the carton.

Another object of this invention is to provide a new and improved handle for milk cartons and the like, wherein the handle is adapted to lie substantially flat and in contact with the sides of the carton when placed in the refrigerator so that the handle does not require any appreciable space in the refrigerator in addition to the space required for the carton itself.

A still further object of this invention is to provide a new and improved handle for milk cartons and the like, wherein said handle is readily attached and detached from its position for use on the carton, whereby the handle can be conveniently and easily moved from one carton to another as desired.

A particular object of this invention is to provide a receptacle for cartons or the like, wherein corner sections are employed for applying a compressive force to the lower corners of the carton while permitting the sides to bulge outwardly, whereby a sealing action occurs at the corners of the carton to prevent or materially reduce leakage of liquid from the carton.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an isometric view illustrating the device of this invention in use with a milk carton;

Fig. 2 is a plan view, partly in section, illustrating the receptacle portion of the device of this invention in particular; and Fig. 3 is a cross-sectional view taken on line 3—3 of Fig. 2 to illustrate the receptacle portion of the device of this invention in detail.

In the drawings, the letter C designates generally a milk carton of known construction, and the letter A designates generally the device of this invention which is adapted to be used with the carton or container C. The carton C is preferably of the type made out of paper or cardboard with a wax coating or other similar coating. Such containers are commonly used for milk, but of course, they could be used for other liquids. As shown in Fig. 1 of the drawings, the carton or container C is formed with four sides 10 which are folded together at the top and are connected at a fold 11 in such a way that a spout 12 may be formed for pouring the milk or other liquid from the carton C. Such construction is a known construction and forms no part of this invention.

The device A of this invention includes a receptacle 20 which is formed with a bottom plate 21 having substantially the same shape as the bottom of the carton or container C with which the device A is used. Therefore, as illustrated, the bottom plate 21 is square in shape to conform with the square bottom portion of the carton or container C. Substantially vertically extending sides 22 are formed with the bottom plate 21, or are connected with such plate 21 to form a dish or receptacle member which is generally designated with the numeral 20. The sides 22 are connected together at corners 23, either during forming of the receptacle 20 or subsequently thereto. Preferably, the receptacle 20 is formed of a plastic such as polyethylene or polytetrafluoroethylene or any other suitable plastic material and therefore the entire receptacle 20 is molded in one piece.

The bottom plate 21 may be, and preferably is, formed with reinforcing ribs 25 on its bottom surface which are of any suitable configuration. Such ribs 25 may be omitted if desired.

At each of the corners 23 of the receptacle 20, a corner section 30 is provided. Such corner sections 30 are molded as a part of the sides 22 when the receptacle 20 is made from a plastic material, but it will be appreciated that the corner sections 30 may be formed separately and then may be connected or positioned at the corners 23 of the receptacle 20. Each of the corner sections 30 includes legs 30a which form right angles with respect to each other and which fit into the corners 23. As best seen in Figs. 2 and 3, the corner sections 30 extend inwardly into the area defined by the sides 22 a greater distance than the inner surfaces of the sides 22. Because of such construction, the corners of the carton or container C are compressed or confined tightly by the corner sections 30 when the carton or container C is positioned in the receptacle 20. Such confining or compressing of the corners of the carton or container C improves the sealing action at such corners of the carton or container C and assists in or prevents leakage of liquid from the carton or container C. It has been found that with the corner sections 30 extending inwardly further than the sides 22, the sides of the carton C are permitted to bulge outwardly to a certain extent with the milk or other liquid therein so that the sides of the carton or container C actually contact the inner surfaces of the sides 22 and that bulging results in the compressive force at the corners of the carton or container C.

In order to provide a reservoir space below the bottom of the carton or container C when it is positioned in the receptacle 20, spacer members 32 are formed or are connected to the upper surface of the bottom plate 21. As shown in the drawings, such spacer members 32 are preferably triangular in shape and are formed integral with the corner sections 30. By so forming the spacer members 32, they assist in compressing and confining the lower corners of the carton or container C in addition to spacing the bottom of the carton or container C above the upper surface of the bottom plate 21. Therefore, if any leakage does occur from the container or carton C, the liquid will be confined within the receptacle 20 and will not drip in the refrigerator or other place of storage.

The device a of this invention includes, in addition to the receptacle 20, a handle strap 40 and a band 41. Preferably, the handle strap 40 and the band 41 are formed of a plastic material such as polyethylene or polytetrafluoroethylene or any other suitable plastic material and they are molded or are otherwise formed in one piece.

The band 41 may take any suitable configuration, but preferably it is formed with the same number of sides as the carton C and it is slidable on such carton C to a suitable position wherein the handle strap 40 is bowed or looped as shown in Fig. 1 to enable a person to use the strap 40 for grasping same and pouring the milk or other liquid from the spout 12 of the carton C.

The handle strap 40 is connected to the band 41 or is formed therewith so that it extends outwardly at a perpendicular angle to the side of the band 41. This positions the strap 40 with a slight bow very readily by simply sliding the band 41 to a suitable position on the carton C. Also, by raising the band 41 upwardly from the position shown in Fig. 1, the strap 40 can be pulled to a substantially flat condition substantially in contact with one side of the carton C so that the device A does not require any room in a refrigerator or other storage space much greater than the carton or container C itself.

The lower end of the strap 40 is connected with the receptacle 20. One means for making such connection is illustrated in Figs. 1 and 2 of the drawings, wherein the strap 40 is shown as having an elongate opening 40a which is adapted to be positioned over a T-shaped button 45. The length of the elongate opening 40a is longer than the button 45 and therefore by turning the lower end of the strap 40, the lower end of such strap 40 can be passed over the button 45 and turned to position same as shown in Figs. 1 and 2 of the drawings. Of course, other suitable connecting means could be used for connecting the strap 40 to the receptacle 20.

In the use of the device of this invention, the receptacle 20 is first attached to the container or carton C by positioning the container or carton C with its lower corners firmly confined by the corner sections 30 of the receptacle 20. The fit between the corner sections 30 of the receptacle 20 and the lower corners of the carton or container C must be sufficiently tight so that the receptacle 20 will not fall from the container or carton C when the container or carton C is lifted.

With the receptacle 20 in position, the band 41 is slipped downwardly over the upper end of the carton or container C to a position sufficiently low enough so that the lower end of the strap 40 can be turned to push the button 45 through the elongate opening 40a for thereby establishing the connection between the lower end of the strap 40 and the receptacle 20. Thereafter, the position of the band 41 is adjusted to obtain a suitable curvature to the strap 40. When the container or carton is in the refrigerator or in another place for storage, the band 41 may be pulled upwardly while still maintaining the connection of the band with the receptacle 20 so that the band 40 becomes substantially flat and does not project outwardly any appreciable distance beyond the outer sides of the container or carton C. Therefore, the device A of this invention does not require any space of any appreciable amount greater than that required for the carton or container C itself.

Furthermore, a plurality of receptacles 20 may be used at one time so that a receptacle 20 is on each of a plurality of cartons or containers C which are in a refrigerator or are in another place of storage and only one handle may be required since it can be transferred from one receptacle 20 to another.

It should be noted that one reason for the connection of the upper end of the handle strap 40 to the band 41 at substantially a right angle is because such construction facilitates the positioning of the flexible handle 40 with the curvature desired for gripping same to facilitate the pouring of the milk or other liquid from the container or carton C.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A receptacle for milk cartons and the like, comprising a bottom plate having substantially the same shape as the bottom of the carton, a plurality of substantially vertical sides extending upwardly from said bottom plate, the number of said sides corresponding to the number of sides on the carton, the adjacent sides having their edges joined together to form a number of corners corresponding to the number of lower corners on the carton, and a corner section at each of said corners including a pair of longitudinally extending legs joined together to form an inwardly extending corner which extends into the area defined by said sides of the receptacle a greater distance than said sides of the receptacle for providing a compressive force on the lower corners of the carton when the carton is placed in the receptacle while permitting the sides of the carton to bulge outwardly for thereby applying a sealing action to the lower corners of the carton for preventing or materially reducing leakage of liquid from the carton.

2. A handle for cartons and the like comprising, a handle strap, means for connecting the lower end of said strap to the lower end of the carton for preventing relative movement of the lower end of the strap with respect to the carton, a band adapted to fit around the carton and slide longitudinally relative thereto, and means connecting the upper end of said handle strap to said band for permitting relative movement of said upper end of said strap relative to said carton and relative to the lower end of said strap, whereby said strap forms an adjustable loop for lifting the carton to pour liquid therefrom.

3. A receptacle for milk cartons and the like, comprising a bottom plate having substantially the same shape as the bottom of the carton, a plurality of substantially vertical sides extending upwardly from said bottom plate, the number of said sides corresponding to the number of sides on the carton, the adjacent sides having their edges joined together to form a number of corners corresponding to the number of lower corners on the carton, a corner section at each of said corners formed by said sides of the receptacle extending into the area defined by said sides of the receptacle a greater distance than said sides of the receptacle, said corner sections defining an area of slightly smaller cross-section than the cross-sectional area of the carton at its lower end for providing a compressive force on the lower corners of the carton when the carton is placed in the receptacle while permitting the sides of the carton to bulge outwardly for thereby applying a sealing action to the lower corners of the carton for preventing or materially reducing leakage of liquid from the carton, a handle strap, a band adapted to fit around the carton and having connection with said handle strap, and means for connecting the lower end of said handle strap to said receptacle, whereby said handle strap is positioned on the carton to enable the carton to be readily lifted for pouring liquid therefrom.

4. A receptacle for milk cartons and the like, comprising a bottom plate having substantially the same shape as the bottom of the carton, a plurality of substantially vertical sides extending upwardly from said bottom plate, the number of said sides corresponding to the number of sides on the carton, the adjacent sides having their edges joined together to form a number of corners corresponding to the number of lower corners on the carton, a corner section at each of said corners formed by said sides of the receptacle extending into the area defined by said sides of the receptacle a greater distance than said sides of the receptacle, said corner sections defining an area of slightly smaller cross-section than the cross-sectional area of the carton at its lower end for providing a compressive force on the lower corners of the carton when the carton is placed in the receptacle while permitting the sides of the carton to bulge outwardly for thereby applying a sealing action to the lower corners of the carton for preventing or materially reducing leakage of liquid from the carton, and a spacer member connected with each corner section of said receptacle and positioned on the upper surface of said bottom plate for contacting the bottom of the carton at the corner to assist in the sealing action at the carton corners and to also position the bottom of the carton above the upper surface of said bottom plate to confine any liquid leaking from the carton.

5. A receptacle for milk cartons and the like, comprising a bottom plate having substantially the same shape as the bottom of the carton, a plurality of substantially vertical sides extending upwardly from said bottom plate, the number of said sides corresponding to the number of sides on the carton, the adjacent sides having their edges joined together to form a number of corners corresponding to the number of lower corners on the carton, a corner section at each of said corners formed by said sides of the receptacle extending into the area defined by said sides of the receptacle a greater distance than said sides of the receptacle, said corner sections defining an area of slightly smaller cross-section than the cross-sectional area of the carton at its lower end for providing a compressive force on the lower corners of the carton when the carton is placed in the receptacle while permitting the sides of the carton to bulge outwardly for thereby applying a sealing action to the lower corners of the carton for preventing or materially reducing leakage of liquid from the carton, a handle strap, a band adapted to fit around the carton and having connection with said handle strap, said band being further adapted to slide longitudinally on the carton, and means for detachably connecting the lower end of said handle strap to said receptacle, whereby said handle strap is positioned on the carton to enable the carton to be readily lifted for pouring liquid therefrom.

References Cited in the file of this patent

UNITED STATES PATENTS

| | | |
|---|---|---|
| 469,490 | Steers | Feb. 23, 1892 |
| 2,765,969 | Bennington | Oct. 9, 1956 |
| 2,775,373 | Coralline | Dec. 25, 1956 |
| 2,782,064 | Montgomery | Feb. 19, 1957 |
| 2,810,502 | Wackerhagen | Oct. 22, 1957 |
| 2,835,414 | Anderson | May 20, 1958 |
| 2,846,120 | Strean | Aug. 5, 1958 |
| 2,868,411 | Kesselman | Jan. 13, 1959 |
| 2,907,493 | Drentlaw | Oct. 6, 1959 |